Sept. 2, 1952 G. G. KEARFUL ET AL 2,609,178
LIFTING JACK

Filed June 10, 1946 2 SHEETS—SHEET 1

Inventors
Godfrey G. Kearful,
Joseph J. Verbrugge &
Ralph O. Malone
By Blackmore, Smart & Hunt
Attorneys Sept. 2, 1952     G. G. KEARFUL ET AL     2,609,178
LIFTING JACK
Filed June 10, 1946     2 SHEETS—SHEET 2
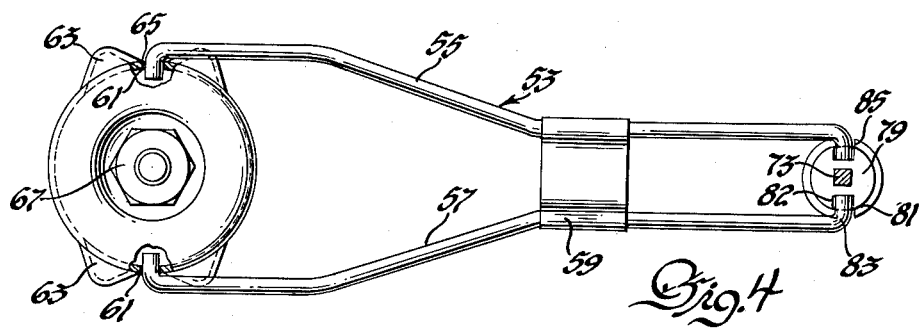
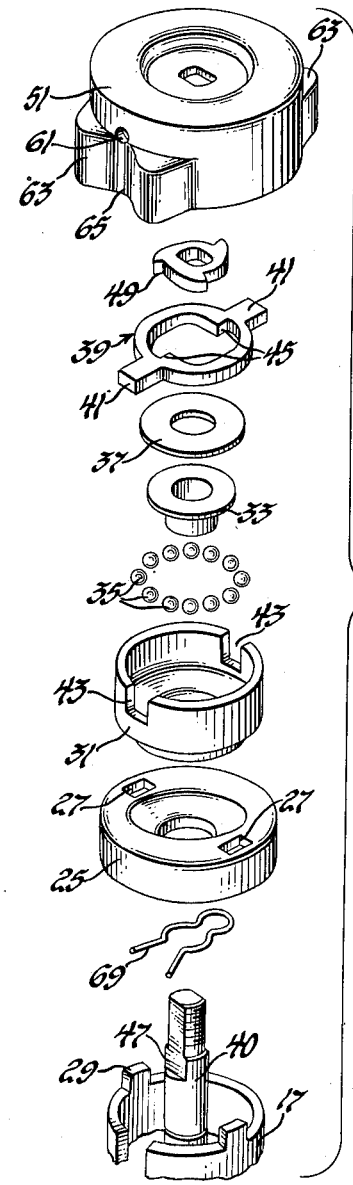
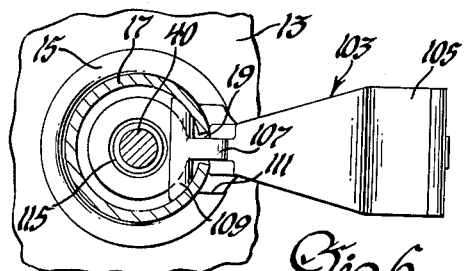
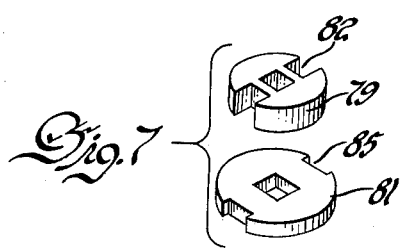
Inventors
Godfrey G. Kearful,
Joseph J. Verbrugge &
Ralph Q. Malone
By Blackmor, Spencer & Hirst
Attorneys Patented Sept. 2, 1952

2,609,178

UNITED STATES PATENT OFFICE 2,609,178

LIFTING JACK

Godfrey G. Kearful, Joseph J. Verbrugge, and Ralph A. Malone, Saginaw, Mich., assignors to General Motors Corporation, Detroit, Mich., a corporation of Delaware Application June 10, 1946, Serial No. 675,538

26 Claims. (Cl. 254—98)

1

This invention relates to lifting jacks. It has been designed more particularly for use with vehicles. In the form shown, it has a part adapted to engage a conventional bumper and it operates to raise the bumper and with it the adjacent part of the vehicle.

A primary object is to provide means whereby the lifting of the load is made quite easy by removing, to as great extent as possible, the friction between the relatively moving parts.

As a further object the invention provides means to introduce some degree of added friction to prevent the restoration of the parts to an initial position under the influence of the load.

Among other objects may be mentioned the use of efficient, simple and inexpensive parts which are used in the manufacture of the novel device.

On the accompanying drawing:

Fig. 4 is a top plan as seen from line 4—4 of Fig. 1.

Fig. 5 is a view in perspective of a group of related parts in disassembled relation.

Fig. 6 is a section on line 6—6 of Fig. 1.

Fig. 7 is a view in perspective of two parts in disassembled relation.

Figures 1, 2, 3:
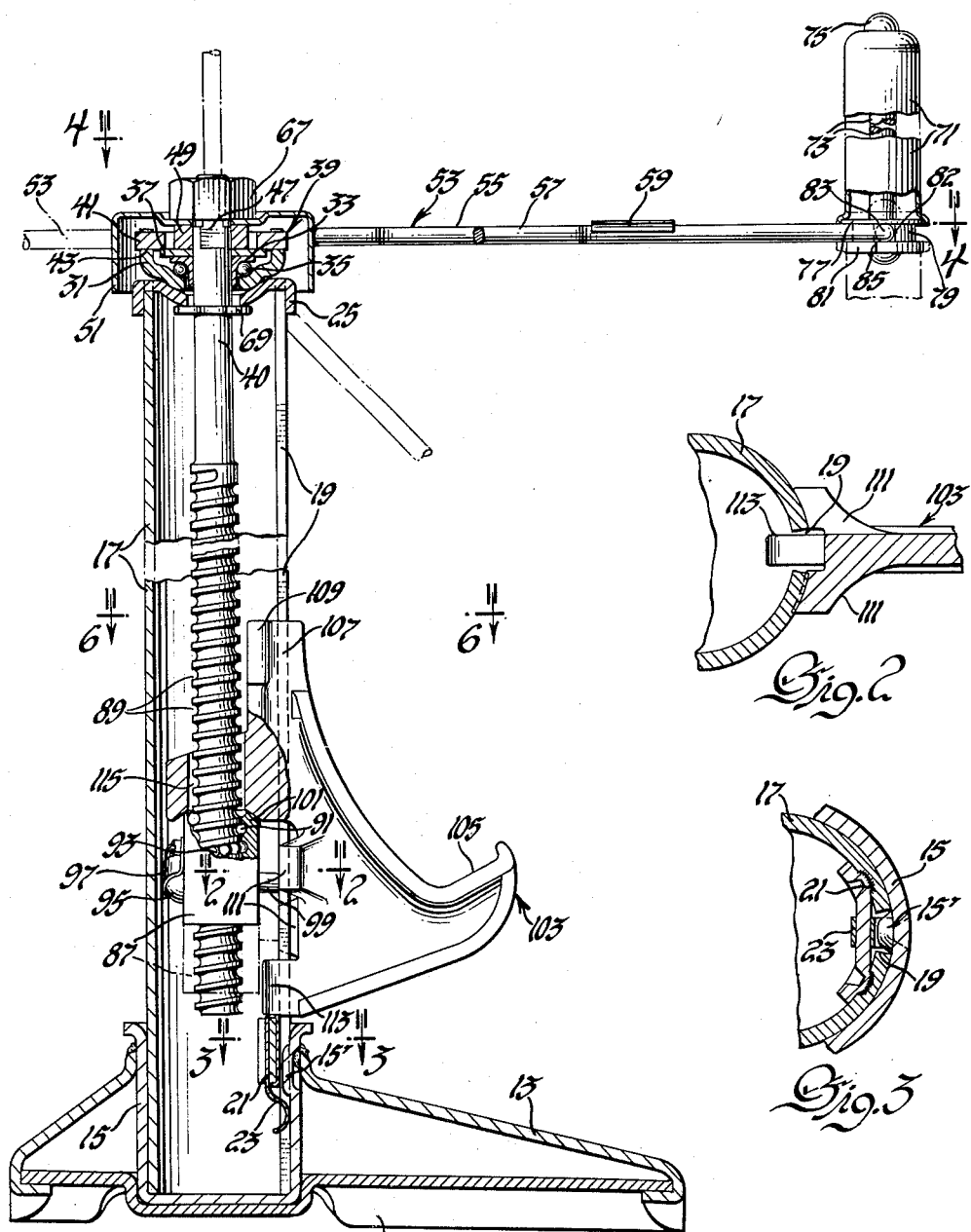
Fig. 1 is a view in vertical section of the novel lifting jack.
Fig. 2 is a section on line 2—2 of Fig. 1.
Fig. 3 is a section on line 3—3 of Fig. 1.

The base is made of three parts, a lower section 11, an upper section 13 and a cup 15 suitably secured together as shown by Fig. 1. Numeral 17 identifies a tubular column carried by the base. This column has a slot 19 extending from end to end. The lower end of the column is supported in cup 15. A strap 21 is fixed to the inside of the column near the lower end. It is surrounded by the anchoring portion of plate spring 23 the free end of which extends through the slot 19 and engages the wall of the cup. Just above the end of the spring the cup is formed with an indented lug 15' projecting into slot 19.

At the top of the column is a cap or cover 25 having openings 27 to receive lugs 29 at the top of the column. Within the cover is an outer cup or ball race 31. An inner race or cone 33 is located in cup 31, balls 35 being placed between parts 31 and 33. Above cone 33 is a washer 37 and above washer 37 is a pawl 39. It has diametrically opposed lugs 41 adapted to slide in notches 43 in cup 31. The pawl is annular in form and has shoulders 45. The several parts thus far enumerated at the top of the column have openings to receive freely the screw 40 which extends down through the column. The

2 upper end of the screw is flatted as at 47 to non-rotatably carry a ratchet 49 which latter occupies the plane of pawl 39. Also non-rotatably carried by the flatted end of the screw is a hood 51.

The screw is to be rotated by a hand lever 53. This lever has two arms 55, 57 held together at intermediate points in their lengths by a clamp 59. The work ends are turned at right angles and extend into apertures 61 in the hood. Just beneath the apertures and on either side thereof are distorted regions 63 forming a channel 65 within which the arms may lie when they extend in a direction parallel with the axis of the screw. A nut 67 on the threaded end of the screw and a spring ring 69 in a groove of the screw spindle complete the assembly. At the power end of the lever or handle is a tubular hand hold 71. Through it passes a spindle 73 having a head or the like 75 engaging the outer end of the tube 71. Within the lower open end of tube 71 is a disc 77 and beneath the disc 77 the stem 73 carries two parts marked 79 and 81. They have square holes to fit the end of the spindle. Part 79 has diametrically opposed notches 82 to receive the power ends 83 of the handle members 55 and 57. Part 81 has notches 85 through which the adjacent ends of parts 55 and 57 may extend to aline the handle with the hand hold. Stem 73 is headed beneath part 81 as shown.

The rotation of the screw by the lever arm or handle 55, 57 serves to reciprocate a nut 87 within the column. The grooves 89 on the screw and 91 on the nut accommodate balls 93. This constitutes the well-known ball and nut gear. It is used because of its excellent antifriction characteristic. Associated with the nut is a ball return guide 95 held by a clamp 97. The nut has a pin 99 projecting into the slot of the column so that the nut may reciprocate as the screw rotates. The nut is substantially spherical on its upper surface 101 where it supports the load supporting hook 103.

The hook 103 is so-called because of its shape. The part 105 is shaped to receive a vehicle bumper not shown. Its upper end has a projection 107 extending through the slot of the column from which extend arms 109 to engage the inner wall of the column on either side of the slot. Below the upper end, the hook has axially spaced arcuate outer arms 111 engaging the outer wall of the column. At its lower end a lug 113 extends from the hook through the slot where it may contact the strap 21. The intermediate part of the hook below the arms 109 and within the column has an enlarged opening 115 surrounding the screw and below which is the rounded surface to engage the nut as explained above.

In lifting the load the hook is engaged under the bumper. Rotation of the handle turns the screw and raises the nut. The substantially spherical surfaces between the nut and the hook and between the supporting parts at the upper end of the screw accommodate any misalignment. The application of the load to the screw is in tension thus avoiding the distortion which tends to occur where the load is applied to the upper end of the screw. A smaller screw is thus made possible. The load is applied at one side of the axis. To accommodate that relation of parts the arms push outwardly on the inner wall of the column above the point of application of the load and inwardly on the outer surface below the point of application. It will be seen that the vertical axis is not quite perpendicular to the base. The application of the load at one side of the axis tends to right it and does not cause it to incline in the opposite direction as it might were it normally perpendicular. The base itself has been designed to serve its purpose well. The downwardly directed supporting surfaces afford a better frictional hold on pavement and tend to prevent slipping because of the engagement of irregularities of the pavement and the supporting feet. On relatively soft ground the whole base supports the load. It will be observed that the base is elongated on the side of the column beneath the hook, thus locating the load over the middle of the base. The indentation of the cup 15 keeps the column from rotation. The strip 21 limits the downward movement of the hook and the spring 23 contacting the cup indentation resists the separation of the base and the column.

It will be understood that when the screw is rotated by the handle the nut moves upwardly carrying the hook and lifting the load. In so doing the ratchet 49 rotates with the screw and the pawl slides back and forth in the notches 43 to permit this action to take place without rotation of cup 31. The antifriction characteristics of the ball and nut bearing makes the operation comparatively easy, so easy in fact that provision must be made to prevent the load causing a reverse operation. Reverse operation causes the pawl and ratchet to engage thus locking together the ball races 31 and 33 and friction is produced between the lower race 31 and the cap 25. The friction is proportional to the impressed load and is enough to hold the load in supported position but is easily overcome by the handle. For convenient positional relation the handle may be swung about its connection with the hood into a variety of positions as shown and the hand hold may be alined with the handle.

We claim:

1. In a lifting jack, a tubular column having a slot, a screw within and projecting from said column, a nut on said screw within the column and a load supporting hook having a part resting on said nut, a non-rotatable cap closing the top of said column, an operating arm, means connecting said arm to said screw, a ratchet connected to said screw for rotation therewith, a cup member supported on said cap means to support said screw on said cup member, and a sliding pawl adapted to cooperate with said ratchet to rotate said cup member in one direction of rotation only to frictionally engage said cap.

2. The invention defined by claim 1, together with antifriction means between said cup and said screw whereby in another direction of screw rotation the screw rotates on the antifriction means on the then non-rotating cup.

3. In a lifting jack, a base, a slotted column projecting therefrom, a cap at the top of the column, a screw within said column, a nut within said column surrounding said screw and having a lug entering said slot, a load supporting hook at one side of said column and having a part projecting through said slot and supported by said nut, means carried by the upper end of said screw and engaging said cap, said nut and hook part and said last named means and cap having rounded engaging surfaces to freely support said screw.

4. In a lifting jack, a column with an elongated opening, support means at the top of the column, a screw within the column, means carried by the upper end of the screw and engaging said support means to freely support the screw, a nut freely mounted within said column and threaded on said screw, interengaging means between said nut and column to prevent rotation of said nut, a load supporting hook at one side of said column having a part projecting through said opening and supported by said nut, the engaging parts of said nut and hook part being substantially spherical, guide means on said hook part engaging said column to transmit the twisting to the column and the part of said load supporting hook supported by said nut transmitting the tension to the screw.

5. In a lifting jack, a base, a slotted column supported thereby, an elongated screw within and projecting from said column, universal support means supporting said screw on said column, a nut within said column and on said screw, a load supporting hook having a first part extending through the slot and supported on said nut, second and third parts engaging the inside and outside walls of said column respectively located above and below said first part, means to rotate said screw and friction means to resist rotation of said screw in one direction, said hook having a fourth part projecting into said slot and a strap secured within said column and straddling said slot, said strap reinforcing said column and adapted to be engaged by said fourth part of the hook to limit its movement, said base having as a part thereof a tubular part to receive the column, and said tubular part having an indentation located within said slot and a spring plate supported by said strap having an end beneath said indentation.

6. In a lifting jack, a base, a slotted column projecting therefrom, a cap at the top of the column, a screw within said column, a nut within said column surrounding said screw and having a lug entering said slot, a load supporting hook at one side of said column and having a part projecting through said slot and supported by said nut, means carried by the upper end of said screw and engaging said cap, said nut and hook part and said last named means and cap having rounded engaging surfaces, said last named means including a cup, a ratchet secured to the screw, a pawl between the ratchet and cup and antifriction means between the ratchet and cup whereby in one direction of screw rotation the cup is non-rotatable and the load is supported by the antifriction means and in the reverse direction of rotation the cup rotates with the ratchet and friction between the cup and cap resists rotation in proportion to the impressed load.

7. In a lifting jack, a base, a slotted column supported thereby, an elongated screw within and projecting from said column, universal support means supporting said screw on said column, a nut within said column and movable on said screw, a load supporting hook having a first part extending through the slot and universally supported on said nut, said universal support means and said universally supported hook permitting movement of the screw and nut to maintain alignment, said nut being formed to permit said movement for alignment, second and third parts of the load supporting hook engaging the inside and outside walls of said column respectively located above and below said first part, and means to rotate said screw and friction means to resist rotation of said screw in one direction.

8. In a lifting jack, a base, a slotted column supported thereby, an elongated screw within and projecting from said column, universal support means supporting said screw on said column, a nut within said column and movable on said screw, an antifriction ball assembly between the screw and nut, a load supporting hook having a first part extending through the slot and universally supported on said nut, said universal support means and said universally supported hook permitting movement of the screw and nut to maintain alignment, said nut being formed to permit said movement for alignment, second and third parts of the load supporting hook engaging the inside and outside walls of said column respectively located above and below said first part, means to rotate said screw and friction means to resist rotation of said screw in one direction.

9. In a lifting jack, a base, a slotted column supported thereby, an elongated screw within and projecting from said column, universal support means supporting said screw on said column, said universal support means comprising a non-rotatable closure cap at the top of the column, means adapted to rotate with the screw and engaging said cap, said last named means and cap having spherical surfaces, a nut within said column and movable on said screw, a load supporting hook having a first part extending through the slot and universally supported on said nut, said universal support means and said universally supported hook permitting movement of the screw and nut to maintain alignment, said nut being formed to permit said movement for alignment, second and third parts of the load supporting hook engaging the inside and outside walls of said column respectively located above and below said first part, means to rotate said screw and friction means to resist rotation of said screw in one direction.

10. In a lifting jack, a base, a slotted column supported thereby, an elongated screw within and projecting from said column, universal support means supporting said screw on said column, said universal support means comprising a non-rotatable closure cap at the top of the column, means adapted to rotate with the screw and engaging said cap, said last named means and cap having spherical surfaces, a nut within said column and movable on said screw, a load supporting hook having a first part extending through the slot and universally supported on said nut, the engaging faces of said nut and the first part of the hook having spherical surfaces, said universal support means and said universally supported hook permitting movement of the screw and nut to maintain alignment, said nut being formed to permit said movement for alignment, second and third parts of the load supporting hook engaging the inside and outside walls of said column respectively located above and below said first part, means to rotate said screw and friction means to resist rotation of said screw in one direction.

11. In a lifting jack, a slotted column, a cap at the top of the column, a screw within the column, means carried by the upper end of the screw and engaging said cap to support the screw, a nut within said column and formed to permit bending of said column and to allow axial movement of the nut in said column, said nut being threaded on said screw, engaging means on said nut to prevent rotation of said nut relative to the column, a load-supporting hook at one side of said column having a part projecting through said slot and slidably supported by said nut, an upper guide portion on said hook engaging the inner surface of said column above said nut, and a lower guide portion on said hook engaging the outer surface of said column below said nut so that the load is applied to the screw only in tension.

12. In a lifting jack, a slotted column, a cap at the top of the column, a screw within the column, means carried by the upper end of the screw and engaging said cap to support the screw, the engaging portions of said cap and screw support means being spherical, a nut within said column and movement of the nut in said column, said nut being threaded on said screw, engaging means on said nut to prevent rotation of said nut relative to the column, a load-supporting hook at one side of said column having a part projecting through said slot and slidably supported by said nut, and the engaging portions of said nut and hook support part are spherical to allow relative adjustment to maintain proper alignment of the parts on the application of the eccentric load on the hook, said nut being formed to permit alignment movement in said column, an upper guide portion on said hook engaging the inner surface of said column above said nut and a lower guide portion on said hook engaging the outer surface of said column below said nut so that the load is applied to the screw only in tension.

13. In a lifting jack, a base, a slotted column supported thereby, an elongated screw within and projecting from said column, support means supporting said screw on said column, a nut within said column and movable on said screw, a load supporting hook having a first part extending through the slot and supported on said nut, the engaging portions of said support means supporting said screw on said column and the engaging portions of said first part of said hook supported on said nut having seat means to correct misalignment, said nut being movable in said column to correct for misalignment so that the screw supports the load in tension, and second and third parts of the load supporting hook engaging the inside and outside walls of said column so that the column supports the load in bending.

14. In a lifting jack, a slotted column, a cap at the top of the column, a screw within the column, means carried by the upper end of the screw and engaging said cap to support the screw, a nut within said column and formed to permit bending of said column and to allow axial movement of the nut in said column, said nut being threaded on said screw, engaging means on said nut to prevent rotation of said nut relative to the column, a load-supporting hook at one side of said column having a part projecting through said slot and slidably supported by said nut, a guide portion on said hook engaging the inner surface of said column above said nut and another guide portion on said hook engaging the outer surface of said column so that the load is applied to the screw only in tension and to the column only in bending.

15. In a lifting jack, a base, a slotted column supported thereby, an elongated screw within and projecting from said column, support means supporting said screw on said column, a nut axially and transversely movable within said column on said screw, a load-supporting hook having a first part extending through the slot and supported on said nut, the engaging portions of said support means supporting said screw on said column and the engaging portions of said first part of said hook supported on said nut having seat means to correct misalignment, said nut being movable in said column to correct for misalignment so that the screw supports the load in tension, second and third parts of the load supporting hook engaging the inside and outside walls of said column so that the column supports the load in bending.

16. In a lifting jack, a slotted column, a cap at the top of the column, a screw within the column, means carried by the upper end of the screw and engaging said cap to support the screw, a nut within said column and having clearance to allow transverse movement of the nut in said column, said nut being threaded on said screw, engaging means on said nut to prevent rotation of said nut relative to the column, a load-supporting hook at one side of said column having a part projecting through said slot and slidably supported by said nut, the engaging portions of said cap and support means carried by said screw and the engaging portions of said nut and hook part supported by said nut having seat means to correct for misalignment, a guide portion on said hook engaging the inner surface of said columnn above said nut, and another guide portion on said hook engaging the outer surface of said column below said nut so that the bending load is applied to the column and the tension load to the screw.

17. In a lifting jack, a support having a base, a screw adjacent said support, a nut on said screw adjacent the support and a load-supporting hook having a part supported on said nut, a non-rotatable seat fixed to the support adjacent the top of said support, an operating arm, means connecting said arm to said screw, a member supported on said seat, a bearing between said screw and member for free rotation, and ratchet means consisting of a ratchet and a sliding pawl one connected to said screw and the other to said member to cooperate to rotate said member in one direction of rotation only to frictionally engage said seat.

18. In a lifting jack, a support having a base, a screw adjacent said support, a nut on said screw adjacent the support and a load-supporting hook having a part supported on said nut, a non-rotatable seat fixed to the support adjacent the top of said support, an operating arm, means connecting said arm to said screw, a ratchet connected to said screw for rotation therewith, a member supported on said seat, a bearing between said screw and said member for free rotation and a sliding pawl adapted to cooperate with said ratchet and said member to rotate said member with said screw in one direction of rotation only to frictionally engage said seat.

19. In a lifting jack, a tubular column having a slot, a screw within and projecting from said column, a nut on said screw within said column, a load supporting member having a part resting on said nut, a non-rotatable member on the top of said column, operating means connected to rotate said screw, a circular toothed ratchet wheel connected to said screw for rotation with said screw, a rotatable member supported on said non-rotatable member, antifriction bearing means supporting said screw on said rotatable member, and a pawl having a circular toothed aperture fitting over said ratchet wheel for cooperation therewith and mounted for transverse sliding movement on and for rotation with said rotatable member to rotate said rotatable member with said screw in one direction of rotation of said screw to frictionally engage said non-rotatable member.

20. In a lifting jack, a tubular column having a slot, a screw within and projecting from said column, a nut on said screw within said column and a load supporting member having a part resting on said nut, a non-rotatable member on the top of said column, operating means connected to said screw to rotate said screw, a ratchet connected to said screw for rotation therewith, a rotatable member supported on said non-rotatable member, antifriction bearing means to support said screw on said rotatable member, and a pawl cooperating with said ratchet and fixed to rotate with said rotatable member to rotate said rotatable member in one direction of rotation only to frictionally engage said non-rotatable member.

21. In a lifting jack, a tubular column having a slot, a screw within and projecting from said column, a nut on said screw within said column, a load supporting member having a part resting on said nut, a non-rotatable member on top of said column, operating means connected to rotate said screw, a circular toothed ratchet wheel connected to said screw for rotation with said screw, a rotatable member supported on said non-rotatable member, antifriction bearing means supporting said screw on said rotatable member, and a pawl having a circular toothed aperture fitting over said ratchet wheel for cooperation therewith and mounted for movement into and out of engagement with said ratchet and for rotation with said rotatable member to rotate said rotatable member with said screw in one direction of rotation of said screw to frictionally engage said non-rotatable member.

22. In a lifting jack, a base, a slotted column supported thereby, an elongated screw within and projecting from said column, universal support means supporting said screw on said column, a nut within said column and movable on said screw, a load supporting member having a first part extending through the slot and universally supported on said nut, said universal support means and said universally supported member permitting movement of the screw and nut to maintain alignment, and said nut being formed to permit said movement for alignment, second and third parts of said load supporting member engaging the wall of said column respectively located above and below said first part and means to rotate said screw and friction means to resist rotation of said screw in one direction.

23. In a lifting jack, a base, a slotted column projecting therefrom, a cap at the top of the column, a screw within said column, a nut within said column surrounding said screw, means cooperating with said nut and entering said slot to prevent rotation of said nut in said column, a load supporting member at one side of said column and having a part projecting through said slot and supported by said nut, means carried by the upper end of said screw and engaging said cap, and said nut and load supporting member and said last named means and cap having rounded engaging surfaces to freely support said screw.

24. In a lifting jack, a column with an elongated opening, support means at the top of the column, a screw within the column, means carried by the upper end of the screw and engaging said support means to freely support the screw, a nut freely mounted within said column and threaded on said screw, interengaging means between said nut and column to prevent rotation of said nut, a load supporting member at one side of said column having a part projecting through said opening and supported by said nut, the engaging parts of said nut and said load supporting member part being substantially spherical, guide means on said load supporting member engaging and acting in opposed directions on said column to transmit the twisting to the column, and the part of said member supported by said nut transmitting the tension to the screw.

25. In a lifting jack, a column with an elongated opening, support means at the top of the column, a screw within the column, means carried by the upper end of said screw and engaging said support means to freely support the screw, a nut freely mounted within said column and threaded on said screw, interengaging means between said nut and column to prevent rotation of said nut, a load supporting member at one side of said column having a part projecting through said opening and freely supported by said nut, guide means on said member part engaging and acting in opposed directions on said column to transmit the twisting to the column, and the part of said member supported by said nut transmitting the tension to the screw.

26. In a lifting jack, a column with an elongated opening, support means at the top of said column, a screw within said column, abutment means carried by the upper end of said screw and engaging said support means, said support means and said abutment means having engaging substantially spherical segmental portions to freely support the screw, a nut freely mounted within said column and threaded on said screw, interengaging means between said nut and column to prevent rotation of said nut, a load supporting member at one side of said column having a part projecting through said opening and supported by said nut, the engaging parts of said nut and member part being substantially spherical segmental portions to freely support said member part on said nut, guide means on said member part engaging and acting in diametrically opposed directions on said column to transmit the twisting to the column, and the part of said member supported by said nut transmitting the tension to the screw.

GODFREY G. KEARFUL.
JOSEPH J. VERBRUGGE.
RALPH A. MALONE.

REFERENCES CITED

The following references are of record in the file of this patent:

UNITED STATES PATENTS

| Number | Name | Date |
|---|---|---|
| 515,317 | Bennett et al. | Feb. 27, 1894 |
| 796,204 | Goodwin | Aug. 1, 1905 |
| 1,272,589 | Whitney | July 16, 1918 |
| 1,304,460 | Doerfler | May 20, 1919 |
| 1,565,805 | Jones | Dec. 15, 1925 |
| 2,043,479 | Greiman | June 9, 1936 |
| 2,125,493 | Foster | Aug. 2, 1938 |
| 2,212,051 | Saunders | Aug. 20, 1940 |
| 2,400,235 | Johnson | May 14, 1946 |

FOREIGN PATENTS

| Number | Country | Date |
|---|---|---|
| 20,617 | Austria | July 10, 1905 |
| 577,304 | France | June 3, 1924 |